United States Patent [19]

Tsuyuki et al.

[11] Patent Number: 4,656,923
[45] Date of Patent: Apr. 14, 1987

[54] LOSS STROKE REDUCING APPARATUS FOR HYDRAULIC SERVOMECHANISM

[75] Inventors: Yasuo Tsuyuki; Yuzoh Gotoh, both of Saitama, Japan

[73] Assignee: Jidosha Kiki Co., Ltd., Tokyo, Japan

[21] Appl. No.: 780,743

[22] Filed: Sep. 27, 1985

[30] Foreign Application Priority Data

Oct. 17, 1984 [JP] Japan .................................. 59-217554

[51] Int. Cl.$^4$ .............................................. F15B 9/10
[52] U.S. Cl. ................................... 91/369 R; 60/547.1
[58] Field of Search ............................ 60/547.1, 548; 91/369 C, 376 R

[56] References Cited

U.S. PATENT DOCUMENTS

| | | | |
|---|---|---|---|
| 3,677,007 | 7/1972 | Goscenski | 60/548 |
| 3,926,093 | 12/1975 | Nakagawa | 60/547.1 |
| 4,075,848 | 2/1978 | Ueda | 60/547.1 |
| 4,196,592 | 4/1980 | Nomura | 60/547.1 |
| 4,377,069 | 3/1983 | Kobayashi | 60/547.1 |
| 4,490,977 | 1/1985 | Fulmer | 60/547.1 |
| 4,506,592 | 3/1985 | Shimamura | 91/369 C |
| 4,514,981 | 5/1985 | Brown | 60/547.1 |

Primary Examiner—Abraham Hershkovitz
Attorney, Agent, or Firm—Sughrue, Mion, Zinn, Macpeak & Seas

[57] ABSTRACT

In a hydraulic servomechanism having an input shaft positioned within a power piston, a key member provided around the input shaft and cooperating with an annular groove in the power piston, so that required movement of the input shaft during operation of the mechanism is reduced.

3 Claims, 1 Drawing Figure

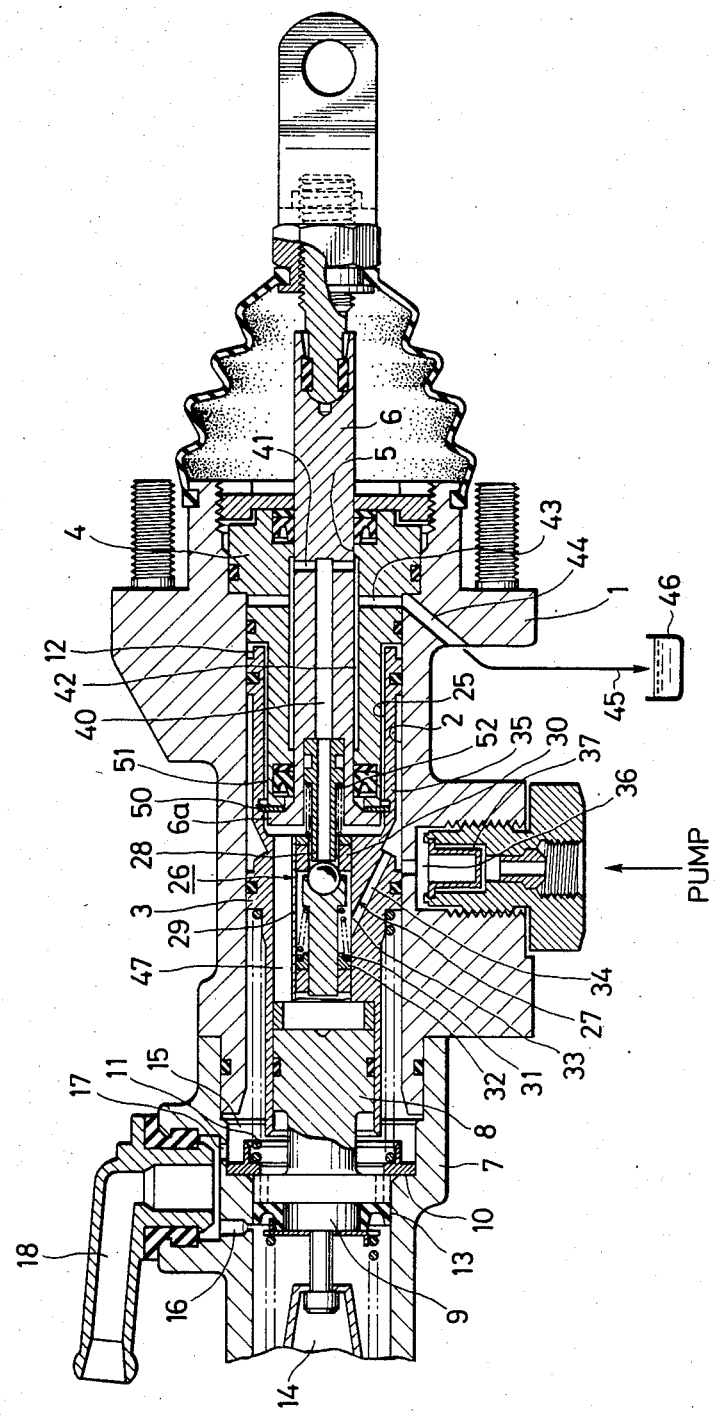
FIGURE

LOSS STROKE REDUCING APPARATUS FOR HYDRAULIC SERVOMECHANISM

BACKGROUND OF THE INVENTION

This invention relates to a hydraulic servomechanism for a hydraulic servo brake or clutch and more particularly to a loss stroke reducing apparatus for a hydraulic servomechanism capable of reducing the loss stroke of an input shaft in the initial stage of operation.

A hydraulic servomechanism is normally equipped with a power piston slidably fitted in a housing, a power chamber formed at one end of the power piston and a control valve operated interlockingly with an input shaft to make the power piston move forward by introducing hydraulic pressure proportionate to the input applied to the input shaft into the power chamber, whereby the hydraulic pressure proportionate to the input introduced into the power chamber is used to boost a small input and convert the input to a boosted output.

Although the control valve is designed to connect the power chamber with a hydraulic pump when the input shaft is moved forward, whereas the power chamber is switched over to communicating with a reservoir when the input shaft is moved backward, the control valve lifting quantity, this is, the input shaft shifting quantity must be increased to secure a sufficient passage area during operation. However, the disadvantage is that, because a large input shaft shifting quantity will be required until the stationary input shaft is moved forward to cause the switching of the passage of the control valve by increasing the input shaft shifting quantity, the loss stroke of the input shaft in its initial stage of operation tends to become larger.

SUMMARY OF THE INVENTION

In view of the foregoing, the present inventors have given particular attention to the fact that a hydraulic servomechanism of this kind is normally provided with a member attached to the inner periphery of the bore of a power piston so as to allow the forward movement of an input shaft but prevent its backward movement beyond a predetermined limit by having the member contact the tip of the shaft to prevent the tip of the shaft from slipping out of the bore of the power piston.

It is therefore an object of the present invention to provide a loss stroke reducing apparatus for a hydraulic servomechanism equipped with a member for preventing an input shaft from slipping out of a power piston chamber, the member being made movable forward relative to the operational direction of the power piston, so that, while the servomechanism is not operated, the housing of the hydraulic servomechanism is provided with a stopper member contacting the slip-off preventive member and holding the input shaft in contact with the slip-off preventive member at its advanced position relative to the power piston, whereby the loss stroke of the input shaft can be reduced easily during initial operation.

BRIEF DESCRIPTION OF THE DRAWING

The sole FIGURE shows a cross sectional view of an embodiment of the present invention as employed in a hydraulic servo brake.

DETAILED DESCRIPTION OF THE INVENTION

In the drawing, there is shown a cylindrical housing 1 of a hydraulic servo brake, a power piston 3 being slidably fitted in an bore 2 provided in its shaft. A plug 4 for closing the rightmost end of the bore 2 is fixed to the housing 1 and is provided with an aperture 5 formed on the same axis as that of the bore 2. The aperture 5 permits an input shaft 6 interlocked with a brake pedal (not shown) to be slidable therethrough.

A master cylinder housing 7 arranged on the same axis as that of the housing 1 is attached around the left end of the housing, while a shaft 8 inserted inside the power piston 3 at the left side thereof is interlocked with a piston 9 of the master cylinder. The power piston 3 is urged to the right by a spring 11 installed between a retainer 10 mounted on the master cylinder and the power piston 3 and held at the non-operating position shown in the drawing. A power chamber 12 is provided in between the rightmost portion of the power piston 3 and the plug 4.

The piston 9 of the master cylinder is equipped with a seal member 13. A primary chamber 14 is positioned in front of the seal member 13, and a secondary chamber 15 is positioned in the rear of the seal member. These primary and secondary chambers 14, 15 are allowed to communicate with a passage 18 respectively through passages 16, 17 formed in the housing 7 of the master cylinder. The passage 18 communicates with the reservoir (not shown) of the master cylinder through a capillary tube (not shown).

The tip of the input rod 6, having a larger diameter portion 6a, is slidably fitted in a stepped chamber 25 which has a larger diameter on the right side of the power piston 3 than on the left side thereof. The rod 6 is inserted in the power piston 3 from the right. A control valve 26 is installed between the tip of the input rod 6 and the stepped chamber 25, and is used to introduce into the power chamber 12 hydraulic pressure corresponding to the intensity of the force applied to the input rod 6. The control valve 26 is equipped with a check valve 27 provided in the stepped chamber 25 of the power piston 3, and an annular pin 28 for forcing the check valve 27 to open.

The valve disc 29 of the check valve 27 is seated on the left side of a valve seat 30 provided inside the power piston 3 and biased rightwardly by a spring 31. A pressure chamber 33, partitioned by a seal for the valve disc 29 and valve seat 30, and by seal member 32 for sealing the valve disc 29, communicates with a pump or accumulator (not shown) through a passage 34 formed in the power piston 3, an annular groove 35 formed in the outer periphery of the power piston 3, a passage 36 formed in the housing 1, and a filter 37 provided along the passage 36, pressure oil being normally introduced in the pressure chamber 33.

The hollow portion of the annular pin 28 communicates with an annular groove 42 formed in the plug 4 through an axial pressure 40 and a radial passage 41, both formed in the input shaft 6, and further with a reservoir 46 of a pump (not shown) through a passage 43 formed in the plug 4, a passage 44 formed in the housing 1 and a capillary tube 45 connected thereto. The outer periphery of the annular pin 28 communicates with the power chamber 12; the portion to the left of the seal member 32 of the valve disc 29 communicates with the outer periphery of the annular pin 28 through an axial passage 47 formed in the power piston 3.

A key member 50 is positioned to the right of the large diameter portion 6a of the input shaft 6 and within the inner periphery of the stepped chamber 25 of the power piston 3. This key member is used to prevent the large diameter portion 6a from slipping out of the stepped chamber 25. The key member 50 is fitted in an annular groove 51 formed in the inner periphery of the stepped chamber 25, and is movable axially. When the input shaft 6 is urged to the right by a compressed spring 52 installed around the annular pin 28 and inside the left-most portion of input shaft 6, the key member 50 contacts the large diameter portion 6a and also the right end of the annular groove 51 so as to prevent the large diameter portion 6a from slipping out of the stepped chamber.

In this state, the annular pin 28 is largely moved away from the valve disc 29 seated on the valve seat 30 so that the outer periphery and the hollow portion of the annular pin 28, that is, the power chamber 12 and the reservoir 46 are allowed to communicate with each other, a large passage area being provided.

Moreover, the left end of the plug 4 is extended axially and used as a stopper member for the key member 50. In the non-operative condition shown in the FIGURE, the right end face of the key member 50 contacts the left end face of the stopper member 4, whereas the left end face of the key member 50 contacts the large diameter portion 6a provided at the tip of the input shaft 6 to prevent the shaft 6a from undergoing backward movement. At the same time, the key member 50 contacts the left end of the annular groove 51 to prevent the rightward movement of the power piston 3.

In this state, the input shaft 6 is caused to move forward relative to the power piston 3 to the extent of the axial length of the annular groove 51. As a result, the annular pin 28 attached to the input shaft 6 is set close to the valve disc 29 of the check valve 27. Consequently, when the brake pedal is worked to move the input shaft 6 to the left, the tip of the annular pin 28 immediately contacts the valve disc 29 of the check valve 27 and operates the control valve 26, so that the loss stroke in the initial stage of the operation is reduced.

In the non-operative condition shown in the FIGURE, since communication is maintained between the power chamber 12 and the hollow portion of the annular pin 28, which in turn is also communicating with the reservoir 46, the hydraulic pressure in the power chamber 12 is practically non-existent.

If the brake pedal in the illustrated unoperated state is worked to let the input shaft 6 move to the left, the tip of the annular pin 28 immediately will be caused to contact the valve disc 29 of the check valve 27 and this portion will be sealed, whereby the power chamber 12 will be prevented from communicating with the reservoir 46. If the input shaft 6 is still kept moving to the left, the valve disc 29 will be separated from the valve seat 30 by the annular pin 28 and the pressure oil normally introduced in the pressure chamber 33 will be introduced in the power chamber 12 through the outer periphery of the annular pin 28. Since the pressure oil is also supplied at this time at the left side of the valve disc 29 through the axial passage 47 formed in the power piston 3, the valve disc 29 is prevented by the pressure oil introduced in the power chamber from moving to the left.

When the pressure oil is introduced in the power chamber 12, the pressure oil will force the power piston 3 to move to the left against the force of the spring 11, while acting on the input shaft 6 to make the driver sense the repellent force of the brake. In an intermediately loaded state, the hydraulic pressure introduced in the power chamber 12 is regulated at a pressure proportional to the intensity of the input force applied to the input shaft, as is the case with the conventional hydraulic servomechanism, that is, a pressure proportional to the force applied to the brake pedal.

When the brake is released subsequently, the valve disc 29 is seated on the valve seat 30 as the input shaft 6 is moved back, and the supply of the pressure to the power chamber 12 is stopped. The pressure in the power chamber 12 is reduced because the power chamber 12 is allowed to communicate with the reservoir 46 through the hollow portion of the annular pin 28, so that the power piston 3 is moved back to the right because of the resilient force of the spring 11. As set forth above, the key member 50 at this time contacts the large diameter portion 6a at the tip of the input shaft 6 and also contacts the right end of the annular groove 51. At the same time, the annular pin 28 is moved far away from the valve disc 29 seated on the valve seat 30 to allow the power chamber 12 to communicate with the reservoir 46, a large passage area thereby being provided.

When the movement of the key member 50 is stopped upon contact with the left end of the stopper member portion of the plug 4, the backward movement of the input shaft 6 will be simultaneously regulated. However, because the key member 50 is made to move relatively within the annular groove 51, the backward movement of the power piston 3 continues and, when the key member 50 contacts the left end of the annular groove 51, the rightward movement of the power piston 3 will also be prevented. In this state, as mentioned above, the input shaft 6 is moved relative to the power piston 3 to the extent of the axial length of the annular groove 51, so that the loss stroke in the initial stage of the next operation of the input shaft 6 is reduced.

According to the present invention, since the only modification required is to movably fit the key member 50 within the annular groove 51 and utilize the plug 4 conventionally provided in the housing 1 as a stopper member contacting the key member 50, the loss stroke of the input shaft 6 can be reduced relatively inexpensively without further complicating the construction of the mechanism.

What is claimed is:

1. A hydraulic servomechanism comprising:
a housing;
a power piston slidably fitted in said housing, said power piston being formed with an axial bore, and one end of said power piston and an interior of said housing defining a power chamber;
an input shaft having a tip end slidably fitted into said bore of said power piston;
a control valve disposed in said power piston, said control valve being responsive to an advancing movement of said input shaft to supply hydraulic pressure proportional to an input applied to said input shaft to said power chamber to thereby move said power piston frontwardly;
a key member provided in said bore of said power piston and positioned so as to be abuttable with said tip end of said input shaft, said key member allowing advancing movement of said input shaft and preventing its retractive movement at a predetermined level while preventing said tip end of said input shaft from releasing from said bore of said power piston, said key member being disposed slidably with respect to said power piston in a direction of movement thereof and permitting a varying amount of opening of said control valve by controlling relative movement of said input shaft and said power piston; and a plug member disposed around said input shaft and extending into said bore of said power piston, a front end of said plug member serving as a stop member abuttable on said key member in a non-operative state of said servomechanism such that said key member and said input shaft when in contact with said key member are held at an advanced position with respect to said power piston, whereby a loss stroke of said power piston during an initial stage operation is reduced.

2. The hydraulic servomechanism of claim 1, wherein said bore of said power piston is formed with an annular groove engageable with said key member, said key member being slidable with respect to said annular groove.

3. The hydraulic servomechanism of claim 1, wherein said tip end of said input shaft has a large diameter portion whose rear face is abuttable with a front side face of said key member.

* * * * *